(12) United States Patent
Sutton

(10) Patent No.: US 6,725,957 B2
(45) Date of Patent: Apr. 27, 2004

(54) TRUCK CAB SUSPENSION WITH LATERAL LOCATING WHEEL

(75) Inventor: Anthony D. Sutton, Fort Wayne, IN (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 205 days.

(21) Appl. No.: 10/002,029

(22) Filed: Nov. 15, 2001

(65) Prior Publication Data

US 2003/0089541 A1 May 15, 2003

(51) Int. Cl.[7] .............................................. B62D 33/067
(52) U.S. Cl. .............................. 180/89.14; 296/190.05; 296/190.07
(58) Field of Search ........................ 180/89.13, 89.14; 296/190.04, 190.05, 190.07

(56) References Cited

U.S. PATENT DOCUMENTS

| | | | | |
|---|---|---|---|---|
| 3,857,602 A | * | 12/1974 | Karkau et al. ............. | 296/35.3 |
| 4,438,970 A | * | 3/1984 | Boucher ................. | 296/190.07 |
| 4,989,684 A | * | 2/1991 | Conaway ................. | 180/89.15 |
| 5,209,316 A | * | 5/1993 | Bauer ...................... | 180/89.14 |
| 6,073,714 A | * | 6/2000 | McHorse et al. ......... | 180/89.14 |
| 6,168,229 B1 | * | 1/2001 | Kooi et al. ............. | 296/190.07 |
| 6,439,651 B1 | * | 8/2002 | Johansson et al. ...... | 296/190.07 |

* cited by examiner

Primary Examiner—David R. Dunn
(74) Attorney, Agent, or Firm—Jeffrey P. Calfa; Dennis Kelly Sullivan; Susan L. Lukasik

(57) ABSTRACT

A truck cab suspension system provides improved lateral location of the cab and restrains the cab from detachment from the vehicle chassis during accidents. The suspension system offers simplification over the prior art by providing a lateral locating wheel set in a vertical travel between the chassis and the vehicle cab. The travel provides a backup link between cab and chassis. The locating wheel is cushioned to provide bumper like protection for lateral, and both up and down vertical shocks.

17 Claims, 4 Drawing Sheets

TRUCK CAB SUSPENSION WITH LATERAL LOCATING WHEEL

BACKGROUND OF THE INVENTION

1. Field of the Invention

The present invention relates to a cab suspension system for a truck and, more specifically, relates to a suspension providing lateral location for the cab on the chassis and for restraining the cab from detaching from the vehicle chassis during high acceleration events.

2. Description of the Problem

Vehicle cab suspensions isolate occupants of the cab from shock to and vibration of a truck's frame. Many proposed suspensions have been characterized by great mechanical complexity, resulting in added maintenance costs, and by excessive bulk, making it difficult to fit the suspension within the space allowed between the cab and the frame. A factor contributing to the size and complexity of some of these suspensions is the need to proved lateral control over cab position relative to the frame. In addition, some suspensions have required separate components to provide a restraint against cab detachment in accidents. Lateral positioning has been provided on some vehicles by equipping the vehicles with a lateral tracking or locating link, sometimes called a Panhard rod, between the cab and the chassis. Alternatively, lateral rubbing pads have been provided between cab and chassis which bind when the sprung and unsprung masses roll relative to one another.

In U.S. Pat. No. 6,168,229, vander Kooi et al. proposed an alternative suspension system directed to providing lateral positioning of the cab. This system proposed the use of a square metal tube positioned under the aft section of a vehicle cab. The tube is attached to a chassis cross member and is oriented transversely with respect to the direction of elongation of the vehicle. A rubber encased torsion bar is set through the tube and the cab is attached to the free ends of the bar, extending from the tube's opposed open ends.

Means must also be provided for preventing cabs from detaching from frames during catastrophic events. Such means have often been provided with by attaching metal straps between the cab and the vehicle's frame.

SUMMARY OF THE INVENTION

According to the invention there is provided a vehicle having a suspended cab. The vehicle has a chassis with elongated side frame rails and cross members connected between the side frame rails. One cross member is provided as a support for the back of a vehicle cab. A cab attachment plate is supported above the cross member and provides an attachment point for the floor of the cab. A pair of air springs is disposed between cab attachment plate and the cross member for supporting the cab. A pair of shock absorbers are attached between the cab attachment plate and the cross member for damping vertical movement of the cab. Lateral positioning of the cab and limits to the vertical travel of the cab are provided by a lateral locating wheel mechanism. The lateral locating wheel mechanism includes a roller attachment bracket which may be mounted upwardly from the cross member. A roller contact bracket is mounted downwardly from the cab attachment plate, with the cab attachment plate providing an upper limit to linear travel defined by the roller contact bracket, which defines a vertical guide in which the roller can move up and down. A roller mechanism is mounted to the roller attachment bracket and through the roller contact bracket. In the preferred embodiment the roller mechanism further comprises a single roller having a relatively rigid core and an overmolded rubber shell shaped spherically to provide a non-linear spring rate upon compression.

Additional effects, features and advantages will be apparent in the written description that follows.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE INVENTION

Figure 1:
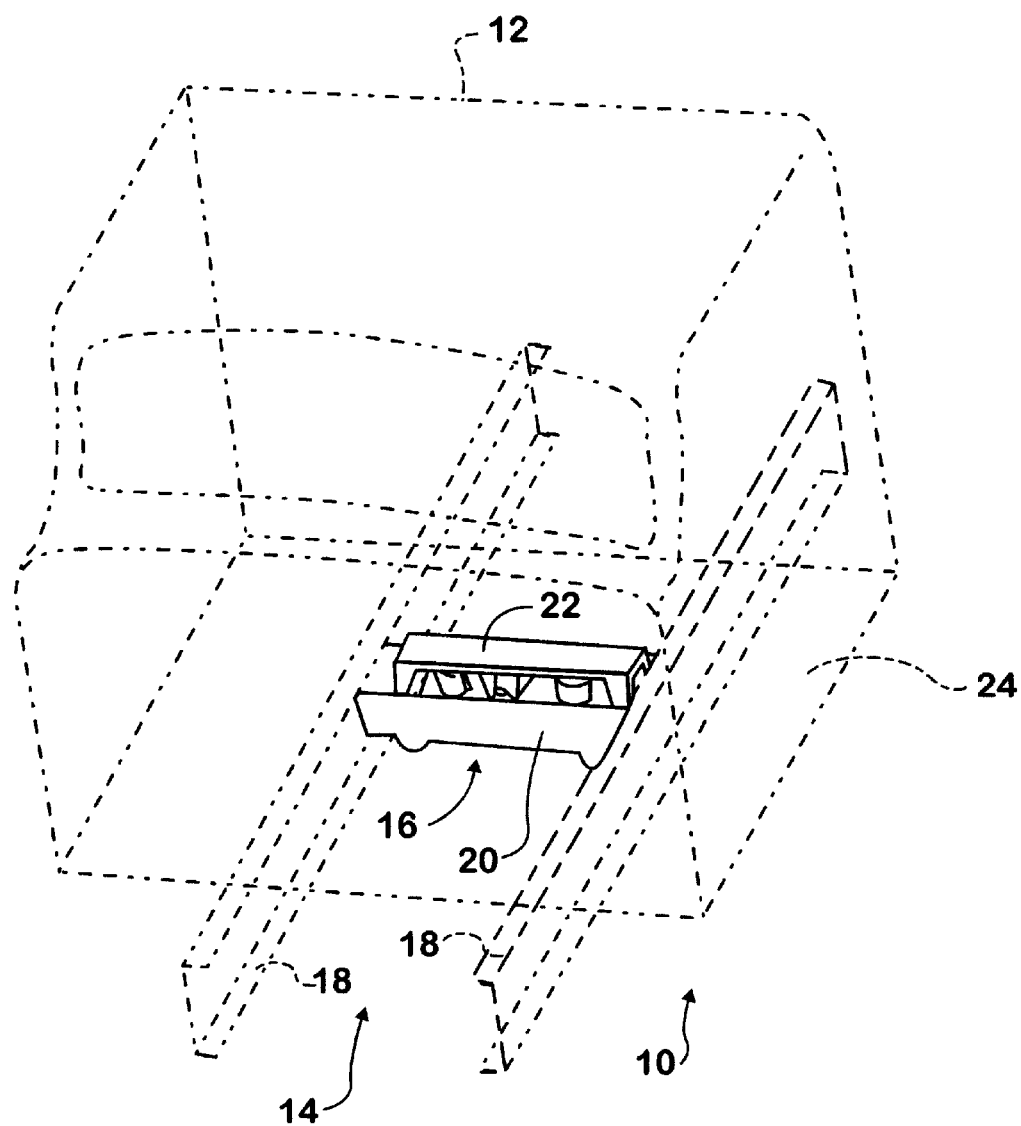
FIG. 1 is a perspective view of a truck incorporating the suspension of the present invention showing placement thereof relative to a truck cab and chassis, which are illustrated in phantom.

Referring now to the figures and more particularly to FIG. 1, there is illustrated a vehicle 10 incorporating a cab suspension 16 according to a preferred embodiment of the present invention. Cab suspension 16 is positioned between a cab 12 and a frame 14 of a truck, and is mounted between side frame rails 18.

Suspension system 16 includes a cross member 20, which is attached at its respective ends to right and left siderails 18. Suspended above the cross member 20 is a cab attachment plate 22, which may be connected by appropriate fasteners to a floor 24 of, or framing for, cab 12.

Figure 2:
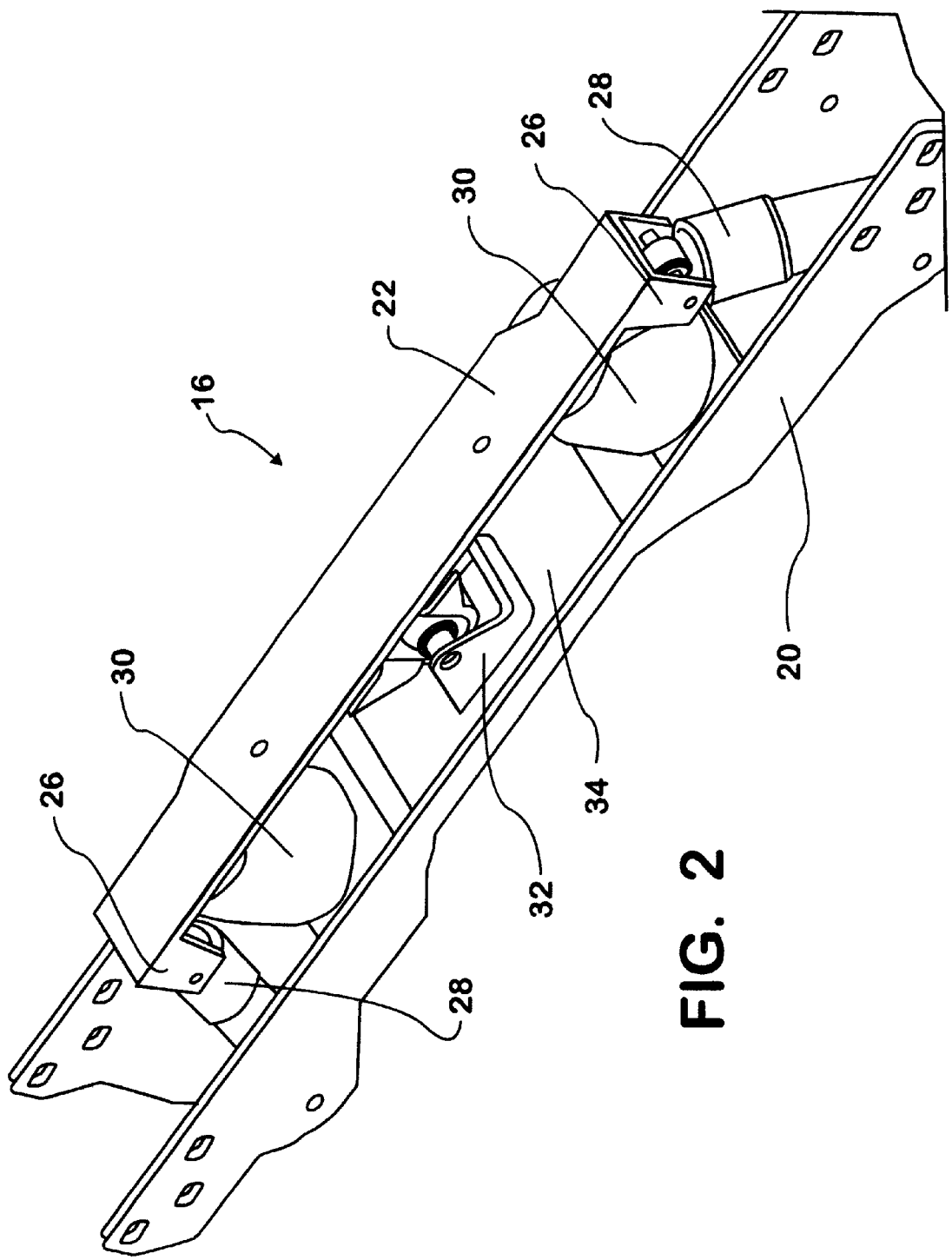
FIG. 2 is a detailed perspective view of the suspension of the present invention.
Figure 3:
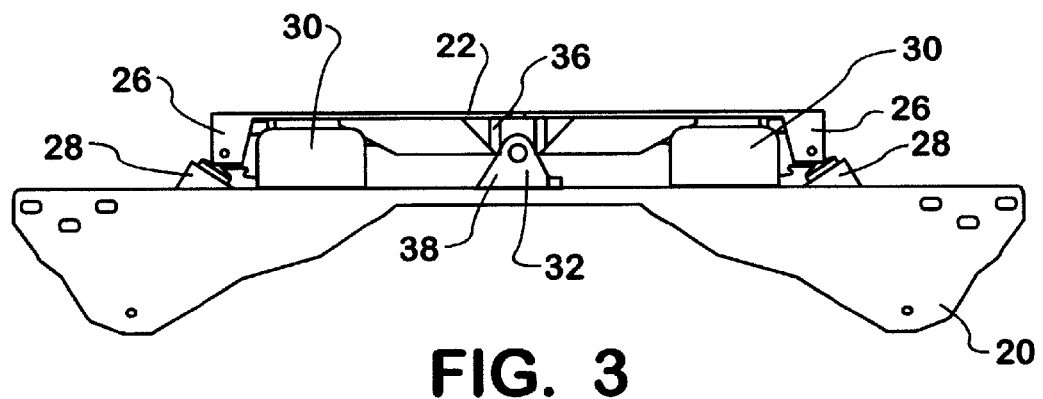
FIG. 3 is an elevation view of the suspension of the present invention.

FIGS. 2 and 3 illustrate cab suspension 16 in greater detail. Cross member 20 is positioned latitudinally oriented between frame siderails 18 at a position under the intended installation point for the aft portion of vehicle cab 12. Cross member 20 includes a pan 34 which provides a base for supporting two air springs 30 which are located aligned with one another perpendicular to the direction of elongation of frame 14. A Panhard wheel mechanism 32 is located between air springs 30. Panhard wheel mechanism 32 maintains lateral positioning of the cab 12 on the vehicle frame 14. Panhard wheel mechanism 32 comprises an upper roller contact bracket 36 and a lower roller attachment bracket 38 which are centered between side rails 18.

A cab attachment plate is positioned atop of air springs 30 and is further attached to the top of the Panhard wheel mechanism 32 by the upper roller contact bracket 36. Cab attachment plate 22 is an elongated plate which terminates at each of two ends in downwardly oriented brackets 26, which in turn provide points of attachment for two shock absorbers 28. Shock absorbers 28 are located at the outside ends of cross member 20 and cab attachment plate 22 outside of air wrings 30 and are pivotally attached at one end each to the brackets 26 located at the opposite ends of the cab attachment plate and at their opposite ends to opposite ends of cross member 20. Air springs 30 are inflated by a pump (not shown) in response to changes from a desired spacing between the cross member 20 and the cab attachment plate 22. A valve, positionable to admit or discharge air from air springs 30, may be controlled by an appropriate lever mechanism positioned in response to the changes in the spacing between-the cross member 20 and the attachment plate 22.

Figure 4:
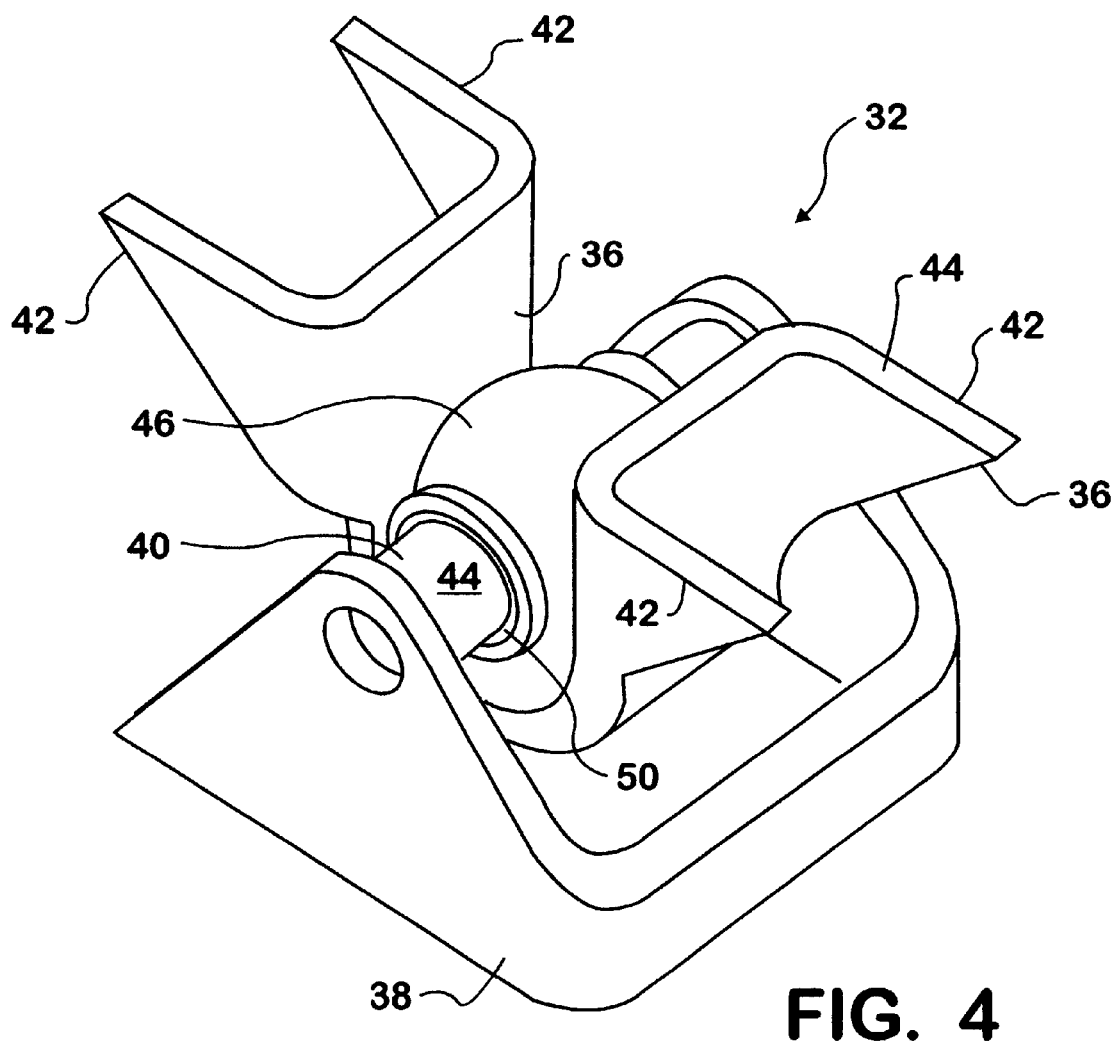
FIG. 4 is a perspective view of a combination Panhard wheel, rebound and bump stop and collision restraint mechanism, which is an integral part of the suspension.

FIG. 4 illustrates Panhard wheel mechanism 32 in greater detail. The Panhard wheel mechanism 32 restrains the cab 12 from excessive lateral movement relative to the frame 14 of vehicle 10, and while the Panhard wheel allows some up and down movement of the cab, it also provides stops defining the limits of the cab's up and down travel. It further provides cushioning on impact of the roller 40 at the top and bottom of the travel of the wheel in the roller contact bracket 36. Lastly, Panhard wheel mechanism 32 provides a restraint against detachment of the cab 12 from the frame 14 of the vehicle 10.

Panhard wheel mechanism 32 includes three major components, an upper roller contact bracket 36, a lower roller attachment bracket 38, and a roller 40. Upper roller contact bracket 36 is a generally U-shaped member having support wings 42 extending outwardly from its sides. The interior surfaces of the upper roller contact bracket 36 serve as a vertically oriented guide in which roller 40 rides and which restrain the roller from lateral movement. Bracket 36 can be attached to either the upper sprung mass, as shown in the preferred embodiment, or to the lower, unsprung mass. The top surface 44 of bracket 36 is flat for attachment by welding or fasteners to the bottom surface of the cab attachment plate 22. Support wings 42 provide strength and an increased area for surface contact with the cab attachment plate 22 to better brace the bracket on the attachment plate. The interior U-channel provides a linear travel in the vertical direction for roller 40 relative to attachment plate 22, the upper limit of which is defined by the cab attachment plate 22 and the lower limit of which is the bottom of the "U".

Roller 40 is fitted through upper roller contact bracket 36 and has an axis or rotation in the plane of the vehicle centerline, parallel to the side frame rails 18. The fit between roller 40 and the walls of the U-shaped channel defined by upper roller contact bracket 36 is not a snug one in the preferred embodiment, there being allowance for some side to side play to allow the roller to turn. Roller 40 is preferably a single wheel of two or three part construction with a rigid interior section 44, preferably made of a hard plastic, and a softer, elastic exterior shell 46, which has a generally spherical shape for contact with the contact bracket 36. Exterior shell 46 is generally made of an elastomeric polymer, such as rubber. The spherical shape of shell 46 gives the shell a non-linear, increasing spring rate with compression. This preserves the isolation between the sprung and unsprung masses. In a three section embodiment, roller 40 has an inner metal sleeve 50 to provide a point of tight grip for a retaining bolt used to assemble the roller. It also provides a better bearing surface for the plastic inside the rubber and reduces rattles from the bolt and roller.

The lower roller attachment bracket 38 has a generally C-shaped footprint, with two wedge shaped plate sections at the ends connected by an intermediate section. Roller 40 is mounted for rotation between the two wedged shaped sections. Lower roller attachment bracket 38 retains the roller 40, and may be attached to either the unsprung mass, as illustrated, or to the sprung mass.

Figure 5:
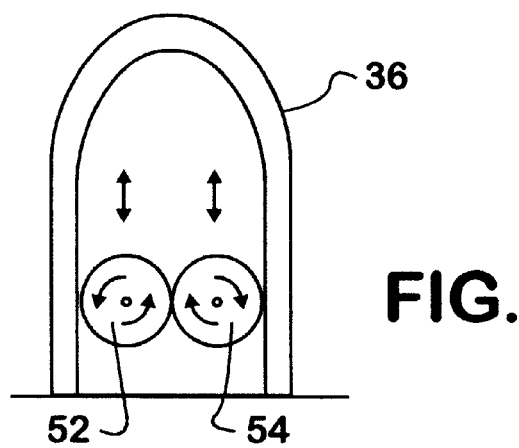
FIG. 5 is a schematic of an alternative embodiment of a roller for use in the mechanism of FIG. 4.

FIG. 5 illustrates an alternative to a single roller 40. Two counter rotating rollers 52 and 54 are set inside the U-shaped channel of a roller contact bracket 36. Rollers 52 and 54 are snugly positioned in the channel for more accurate lateral location of the cab. However, vibration isolation of this arrangement is inferior to single roller embodiments of the invention.

Figure 6:
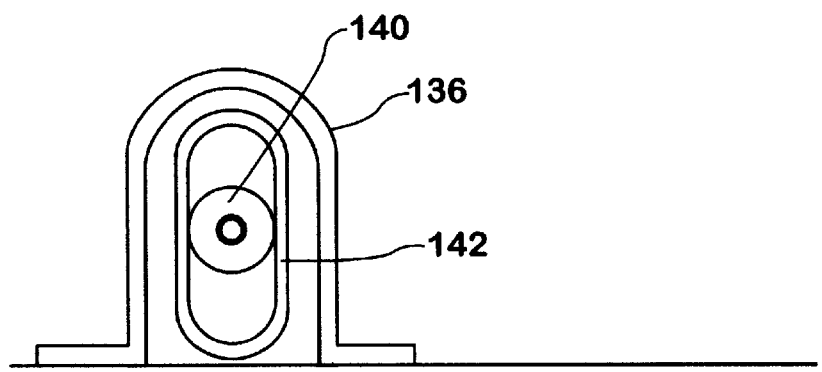
FIG. 6 is a schematic of an alternative embodiment of a contact bracket and roller for use in the mechanism of FIG. 4.

FIG. 6 illustrates yet another embodiment of the Panhard wheel mechanism in which the cushioning materials are from the roller 140 are replaced with a liner applied to an interior channel in the contact bracket 136. Here the vertical linear travel of the roller 140 is lined with a rubber liner 142.

The invention provides lateral location of the suspended cab. It also provides a non-linear cushioned rebound and bump stop. All of this is achieved while effecting excellent isolation between the relatively unsprung chassis and the sprung cab. The size of the mechanism in minimal and it is mechanically simple, while providing good mechanical resistance against separation.

While the invention is shown in only one of its forms, it is not thus limited but is susceptible to various changes and modifications without departing from the spirit and scope of the invention.

What is claimed is:

1. A cab suspension for a vehicle having an elongated chassis supporting a cab comprising:
    a cross member positioned between side frame rails of the chassis transverse to the direction of elongation of the chassis;
    a cab attachment plate supported above the cross member;
    a pair of air springs aligned on one another perpendicular to the direction of elongation of the chassis, with one air spring each being located toward each side of the chassis and disposed between cab attachment plate and the cross member for supporting the cab attachment plate from the cross member outside of the pair of air springs; and
    a pair of shock absorbers attached between the cab attachment plate and the cross member outside of the pair of air springs; and
    a lateral positioning element located vertically between the cross member and the cab attachment plate and horizontally between the air springs, the lateral positioning element including;
    a roller contact bracket,
    a roller attachment bracket extending around opposite sides of the roller contact bracket, and
    a roller mechanism fitted through the roller contact bracket for linear movement to points of support on the roller contact bracket, allowing vertical displacement between the cross member and the cab attachment plate to vary.

2. A cab suspension as claimed in claim 1, the roller mechanism further comprising:
    a single roller having a relatively rigid core and an overmolded rubber shell shaped to provide a non-linear spring rate upon compression.

3. A cab suspension as claimed in claim 2, the roller further comprising:
    the overmolded rubber shell being spherical.

4. A cab suspension as claimed in claim 1, further comprising:

the roller attachment bracket being mounted to the cross member; and the roller contact bracket being mounted downwardly from the cab attachment plate with the cab attachment plate providing an upper limit to linear travel of the roller mechanism in the roller contact bracket.

5. A cab suspension as claimed in claim 1, wherein the roller mechanism further comprises a single roller having a relatively rigid core and an overmolded rubber shell shaped to provide a non-linear spring rate upon compression.

6. A cab suspension as claimed in claim 5, further comprising:

the overmolded rubber shell being spherical.

7. A cab suspension as claimed in claim 1, wherein the roller mechanism further comprises:

a pair of rollers fitted side by side through the roller contact bracket.

8. A cab suspension as claimed in claim 1, wherein the roller contact bracket is lined with a cushioning material for contact with the roller mechanism.

9. A vehicle comprising:

a chassis having elongated side frame rails;

a cross member positioned between the elongated side frame rails and perpendicular to of the chassis;

a cab attachment plate supported above the cross member;

a cab supported from below by the cab attachment plate;

a spring disposed between cab attachment plate and the cross member for supporting the cab;

a pair of shock absorbers, one attached between each of the outer portions of the cab attachment plate and the cross member; and a lateral locating wheel and vertical guide assembly attached between the cab and the chassis centered between the shock absorbers.

10. The vehicle of claim 9, the lateral locating wheel and vertical guide assembly further comprising:

a roller attachment bracket mounted upwardly from the cross member;

a roller contact bracket mounted downwardly from the cab attachment plate with the cab attachment plate providing an upper limit to linear travel defined by the roller contact bracket; and a roller mechanism mounted to the roller attachment bracket and through the roller contact bracket.

11. A vehicle as claimed in claim 9, wherein the roller mechanism further comprises a single roller having a relatively rigid core and an overmolded rubber shell shaped to provide a non-linear spring rate upon compression.

12. A vehicle as claimed in claim 11, further comprising:

the overmolded rubber shell being spherical.

13. A vehicle as claimed in claim 12, wherein the spring comprises two air springs disposed horizontally on opposite sides of the roller attachment bracket toward the elongated frame side rails and vertically between the cab attachment plate and the cross member.

14. A vehicle as claimed in claim 9, wherein the roller mechanism further comprises a pair of rollers fitted side by side through the roller contact bracket.

15. A vehicle as claimed in claim 9, wherein the roller contact bracket is lined with a cushioning material for contact with the roller mechanism.

16. A suspension for a cab supported from a chassis for a vehicle, comprising:

a vertically oriented guide positioned between the cab and the chassis;

a positioning wheel attached to one of the cab and the chassis and fitted through the vertically oriented guide to limit vertical movement of the cab relative to the chassis and to substantially prevent lateral movement of the cab relative to the chassis; and the positioning wheel having an elastomeric exterior shell shaped to give the wheel a non-linear spring rate.

17. A suspension as claimed in claim 16, further comprising a second positioning wheel mounted side by side with the positioning wheel through the vertically oriented guide.

* * * * *